United States Patent [19]

Kawamura

[11] Patent Number: 4,653,873

[45] Date of Patent: Mar. 31, 1987

[54] ZOOM LENS

[75] Inventor: Atsushi Kawamura, Yokosuka, Japan

[73] Assignee: Ricoh Company, Ltd., Tokyo, Japan

[21] Appl. No.: 663,376

[22] Filed: Oct. 22, 1984

[30] Foreign Application Priority Data

Oct. 20, 1983 [JP] Japan .................. 58-195278

[51] Int. Cl.$^4$ .................. G02B 15/16; G02B 15/22
[52] U.S. Cl. .................. 350/427; 350/426; 350/428
[58] Field of Search ............. 350/426, 428, 423, 427

[56] References Cited

U.S. PATENT DOCUMENTS 4,516,839  5/1985  Tokumaru .................. 350/427 X

Primary Examiner—John K. Corbin
Assistant Examiner—Scott J. Sugarman
Attorney, Agent, or Firm—Oblon, Fisher, Spivak, McClelland & Maier

[57] ABSTRACT

Provided is a zoom lens including four lens groups having refracting powers of negative, positive, negative and positive, respectively, arranged in the mentioned order from the objective side of the zoom lens, wherein, upon zooming from a short focal length to a long focal length, a first lens group moves at first toward the image side and then is reversed to move toward the objective side, while second, third and fourth lens groups all monotonously move toward the objective side.

10 Claims, 15 Drawing Figures

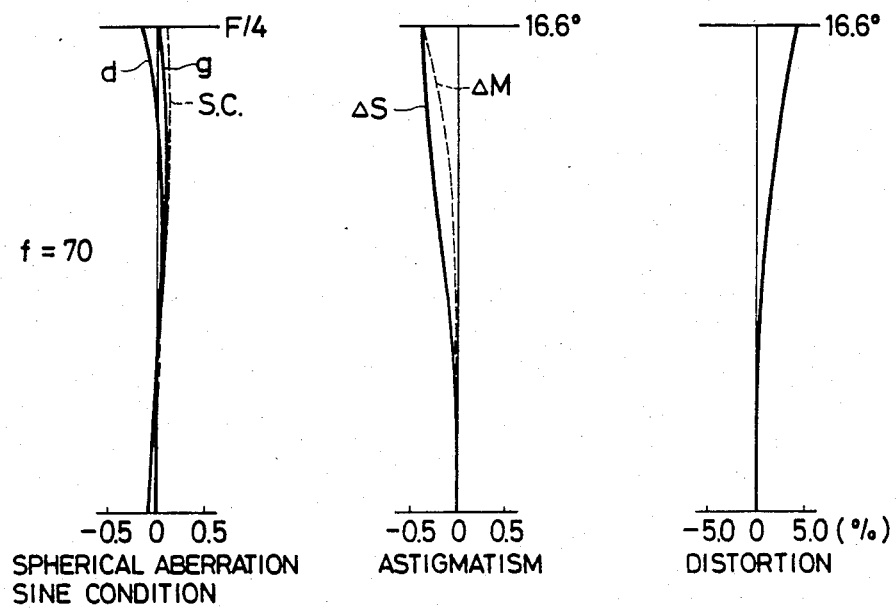

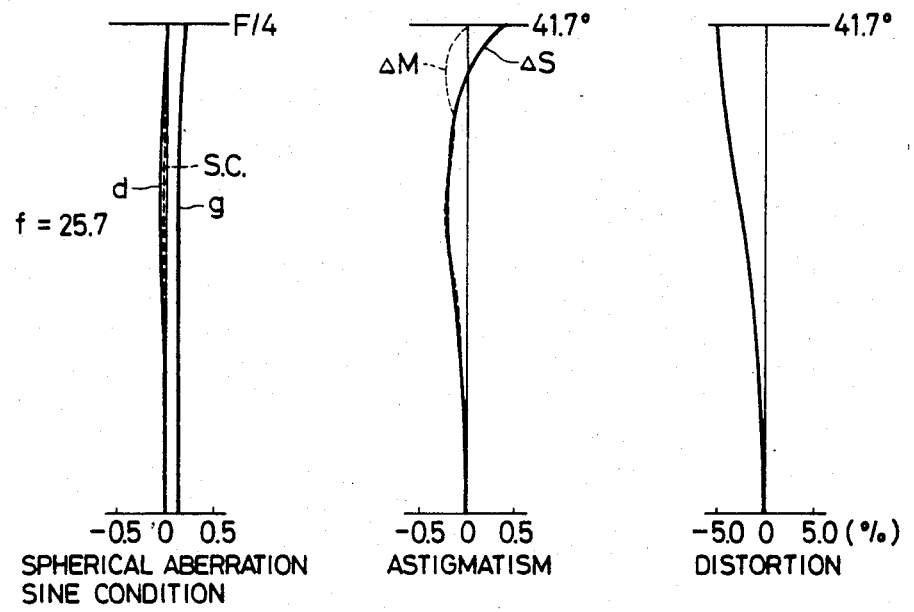
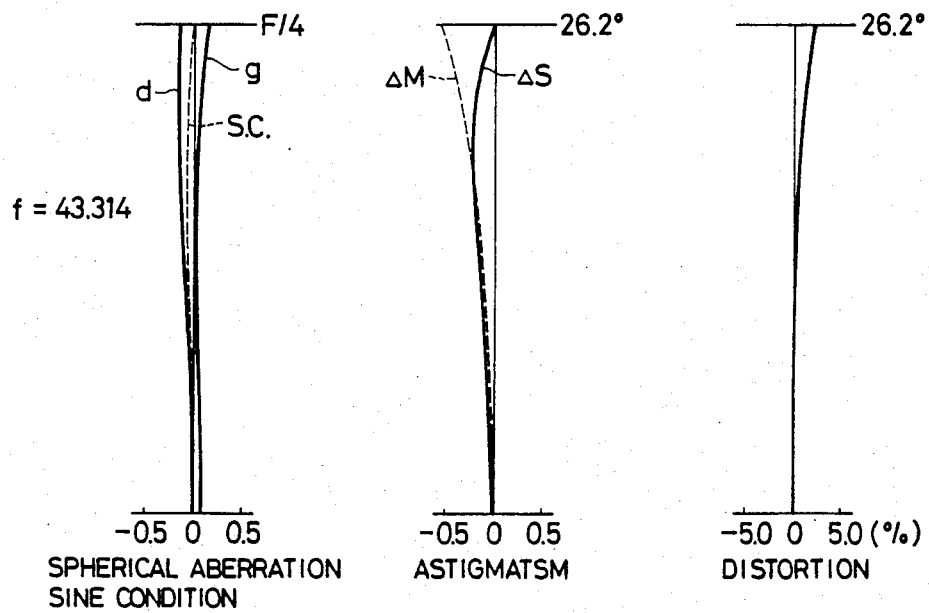

ZOOM LENS

BACKGROUND OF THE INVENTION

1. Field of the Invention

The present invention relates to a zoom lens, and particularly to a zoom lens having a picture angle reaching up to 84 deg. at its wide angle end, and a variable power ratio amounted to about 3, preferably used as an interchangeable lens for a single-lens reflex camera of 35 mm size.

2. Description of the Prior Art

Recently, the picture angle, to be covered, of zoom lenses used as interchangeable lenses for a 35 mm size still camera is more and more large. There may be found two trends in such a kind of zoom lenses.

One of these trends is to increase the variable power ratio of the zoom lens even through the picture angle there of becomes more or less small so that the zoom lens has 28 mm at its wide angle end and a variable power ratio of 3. A zoom lens of this type is disclosed in, for example, Japanese Patent Publication No. 14403/80.

The other of the trends is to provide a zoom lens which has a super-wide angle amounted to 24 mm at its wind angle end even though its variable power ratio is small such as, for example, about 2. Zoom lens of such a kind are disclosed in, for example, Japanese Patent Laid-Open Publication No. 118213/82 and Japanese Patent Laid-Open Publication No. 26816/82.

However, in the former zoom lens, if the zoom lens is shifted to the wide angle side while its zoom ratio is maintained, the amounts of aberrations generated in an obliquely incident light beam, such as, for example, astigmatism and chromatic aberration of magnification in particular, are made large so that a high performance cannot be obtained on the short focal length side, and as well the space between the first and second lens groups becomes large, causing an increase in the diameter of the front lens or a decrease in the brightness of the edges of the image field.

Meanwhile, in the latter zoom lens, if its zooming range is extended to the telescopic side to increase its zoom ratio, aberration due to an increase in the lens diameter, such as, for example, spherical aberration, color-offset due to spherical aberration, and coma in particular become large. Further, the zoom lens inevitably has a large size since the moving distance of the variator is large, and as well, the operationability of the zoom lens is made deteriorate.

SUMMARY OF THE INVENTION

An object of the present invention is to provide a zoom lens which is improved of the afore-mentioned well-known zoom lens while still having the advantages of the same, thereby the zoom lens according to the present invention has a super-wide angle and a large variable power ratio which are beyond those of conventional zoom lenses, and as well is compact and well-compensated in aberrations.

According to the present invention, there is provided a zoom lens, which has an arrangement and a moving locus diagram as shown in FIGS. 1 and 2, including a first lens group (I) having a negative refractive power, a second lens group (II) having a positive refractive power, a third lens group (III) having a negative refractive power and a fourth lens group (IV) having a positive refractive power, which are arranged in the mentioned order from the objective side of the zoom lens, wherein, upon zooming from the short focal length side to the long focal length side, the first-lens group (I) moves at first to the image side and then is reversed to move toward the objective side, while the second, third and fourth lens groups monotonously move toward the objective side by different distances, respectively, and further the following conditions are satisfied:

$$1.2 < |f_1|/f_w < 1.8 \tag{1}$$

$$0.9 < f_2/f_w < 1.4 \tag{2}$$

$$0.8 < |f_3|/f_w < 1.3 \tag{3}$$

$$0.9 < \{(r_{20} - r_{21})/r_{20} \cdot r_{21}\} \cdot f_3 < 1.5 \tag{4}$$

$$0.4 < \{(n_{14} - n_{15})/r_{26}\} \cdot f_4 < 0.7 \tag{5}$$

$$0 < l_3/l_2 < l_4/l_2 < 1 \tag{6}$$

where
- $f_w$: shortest focal length;
- $f_i$: focal length of i-th lens group;
- $l_i$: moving distance of i-th lens group;
- $r_{20}$, $r_{21}$: radii of curvature of objective and image side surfaces of air lens in third lens group:
- $r_{26}$: radius of curvature of joint surface in fourth lens group; and
- $n_{14}$, $n_{15}$: refractive indexes of lens materials on both sides of joint surface in fourth lens group, with respect to d-ray.

Among the above-mentioned conditions, the condition (1) gives the refractive power of the first lens group which acts as a compensator for maintaining a constant image position during zooming, and dominates not only the aberration compensation of the zoom lens but also the important characteristics of the zoom lens, such as, for example, compactness, the shape of curve of a cam, the feed amount of lenses, the brightness of the edges of the image field, etc., thereby the condition (1) has an important factor which is not too much said that it determines the skeleton of the zoom lens.

If the refractive power becomes high in excess of the lower limit of this condition, the generation of coma is made large in the range between the intermediate focal length and the long focal length. Further, it is resulted in an excessive compensation of spherical aberration on the long focal lenth side.

On the contrary, if the refractive power becomes weak in excess of the upper limit of this condition, the space between the first and second lens groups is made large at the end of the short focal length so that the gradient of the cam is steep since the feed amount of lenses should be made large, thereby not only the operationability of the zoom lens deteriorates, but also the diameter of the front lens cannot be easily made small, resulting in lowering of the brightness of the edge of the image field.

The condition (2) is to make the refractive power of the second lens group as a main variator appropriate for reconciling the compensation of aberration and a high variable power ratio.

If the lower limit is exceeded, fluctuations in spherical aberration due to zooming of the lens cannot be eliminated so that spherical aberration due to insufficient compensation firmly remains in the intermediate range of focal length. On the contrary, if the upper limit is exceeded, the effect of variable power decreases, and therefore, the zoom lens cannot have a high zooming magnification. Further, a necessary moving distance becomes large so that a compact zoom lens is not obtainable.

The condition (3) gives the refractive power of the third lens group. The third lens group makes spherical aberration appropriate on the short focal length side in cooperation with the fourth lens group. If the lower limit is exceeded, the spherical aberration in this range is subjected to excessive compensation. If this is compensated by the fourth lens group, coma is generated over all zooming range. On the contrary, if the upper limit is exceeded, such an effect that the arrangement of the lens system becomes a telescopic type is reduced on the long focal length side, resulting in making the lens system large.

The condition (4) relates to the divergent action of the air lens formed in the third group. If the lower limit is exceeded, the refractive power of this air lens becomes excessively weak, and therefore, it is necessary to allot the refractive power to the other specific surfaces. As a result, the concentration of refractive power to the specific surfaces may arise so that large variations in the picture angle of a sagittal image surface come about on the short focal length side, which becomes rapidly excessive at the periphery of the image surface. On the contrary, if the upper limit is exceeded, the sine condition tends to shift toward the negative side, and therefore, the compensation of coma is made difficult.

The condition (5) relates to the refractive power of the joint surfaces included in the fourth lens group. By utilizing such a phenomenon that a light beam directed to the image surface becomes narrow in this surface, the generation of coma is restrained to maintain the image surface at its appropriate position. If the upper limit is exceeded, the generation of coma due to the divergency of the light passing through the peripheral edge part of this image surface is made large. On the contrary, if the lower limit is exceeded, the effect of image surface compensation is insufficient, which is particularly remarkable on the short focal length side. Further, distortion excessively varies upon zooming.

The condition (6) gives the moving distances of the second, third and fourth lens group. Since the angle of the light which emanates from the third lens group and is incident to the fourth lens group and which has a large image angle, is large with respect to the optical axis on the short focal length side, if the space between the first and fourth lens groups is made large, astigmatism increasse, and therefore, the diameter of the rear lens also increases. Therefore, the condition of $l_2 > l_4$ is necessary.

Further, in order to obtain a compact zoom lens, a large refractive power is allotted to each lens group. It is liable to generate the distortion of spool type on the long focal length side due to the strongest refractive power of the third lens group. On the contrary, the inclined angle of the main light ray in the third lens group can be made small by moving the third lens group so as to be positioned away from the image surface, and therefore, distorsion can be reduced. However, since this movement is in the direction in which the variable power is made small, it is not advisable to make this large. Therefore, the condition of $l_4 > l_3$, $l_3 > 0$ is necessary.

Finally, is obtained the following:

$$0 < l_3 < l_4 < l_2.$$

and therefore, $$0 < l_3/l_2 < l_4/l_2 < 1.$$

The zoom lens which satisfies the above-mentioned conditions preferable has a first lens group composed of a negative meniscus single lens $L_1$ having its convex surface directed to the objective side, a positive single lens $L_2$, a negative meniscus single lens $L_3$ having its convex surface directed to the objective side and a jointed lens in which a double-concave lens $L_4$ and a positive meniscus single lens $L_5$ having its convex surface directed to the objective side are jointed together, those lenses being arranged in the mentioned order from the objective side. The arrangement of the first lens group corresponds to, in comparison with that disclosed in the Japanese Patent Laid-Open Publication No. 118213/82, the jointed lens consisting of the fourth lens $L_4$ and the fifth lens $L_5$ which are jointed together. With this arrangement the position of the principal point of the first lens group is advantageous.

The concave lens $L_1$ decrease the inclined angle of peripheral light beam which impinges thereto at a large angle, and then makes the light beam impinge to the positive lens $L_2$ so that the chromatic aberration of manginfication which hinders the realization of wideangle is reduced.

Further, concerning the second and third lens groups, the second lens group is composed preferably of a positive single lens $L_6$, a jointed lens consisting of a negative meniscus lens $L_7$ having a convex surface directed to the objective side and a positive lens $L_8$ jointed together, and a positive single lens $L_9$, those lenses being arranged in the mentioned order from the objective side, and the third lens group is similarly composed preferably of a jointed lens consisting of a positive meniscus lens $L_{10}$ having its convex surface directed to the image side and a double-concave lens $L_{11}$ which are jointed together, and a negative single lens $L_{12}$.

In the above-mentioned type of zoom lenses, the difference in spherical aberration by colors is liable to generate on the long focal length side. The difference by colors is generated, due to excessive compensation, in the second lens group in which the light beam is made widest, and the spherical aberration by under-colors is generated in the jointed surfaces in the first and third lens groups, thereby the spherical aberration by colors in the total optical system can be satisfactorily compensated.

Further, in this arrangement of lenses all joint surfaces are disposed concentrically with a diaphragm which is positioned between the second and third lens groups so that the generation of differences in the curvature of field and coma by colors is made extremely small, and therefore, a zoom lens whose chromatic aberration is satisfactorily compensated can be obtained.

In this type of zoom lenses, the zoom lenses which is possible to be used for macro-photography, are widely available these days. It is preferable that the macro-photography is set on from the short focal length side. In the arrangement of the zoom lens according to the present invention, it is most advantageous to move the second or fourth lens group toward the objective side from the short focal length side in accordance with the condition (6). At this stage, although the first lens group is stationary, if the feed of lenses for short-distance photography is superposed to the above-mentioned function, the photography of maximum magnification can be realized.

DETAILED DESCRIPTION OF THE PREFERRED EMBODIMENTS

Embodiments according to the present invention which satisfy all of the above-mentioned conditions will be explained hereinbelow:

In the tables numeral $d_i$ denotes a spacial distance between i-th and i+1-th refractive surfaces as viewed from the objective side along the optical axis, $v_i$ similarly denotes the abbe's number of the material of i-th lens with respect to d-ray.

Figure 1:
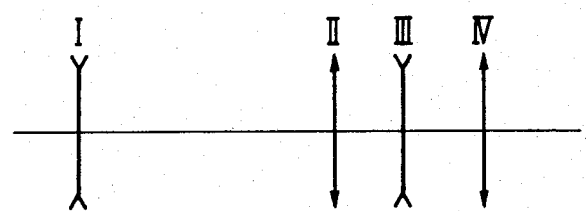
FIG. 1 illustrates a diagram of moving locus of a zoom lens according to the present invention.
Figure 2:
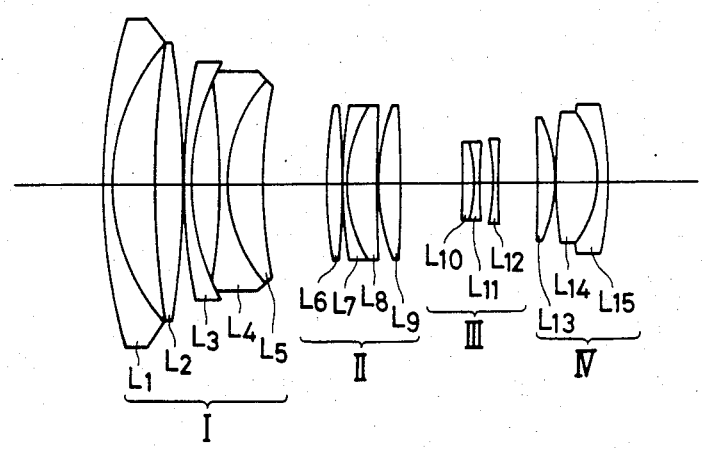
FIG. 2 illustrates a view for the arrangement of lenses having an intermediate focal length in the first embodiment of the present invention.
Figure 3A:
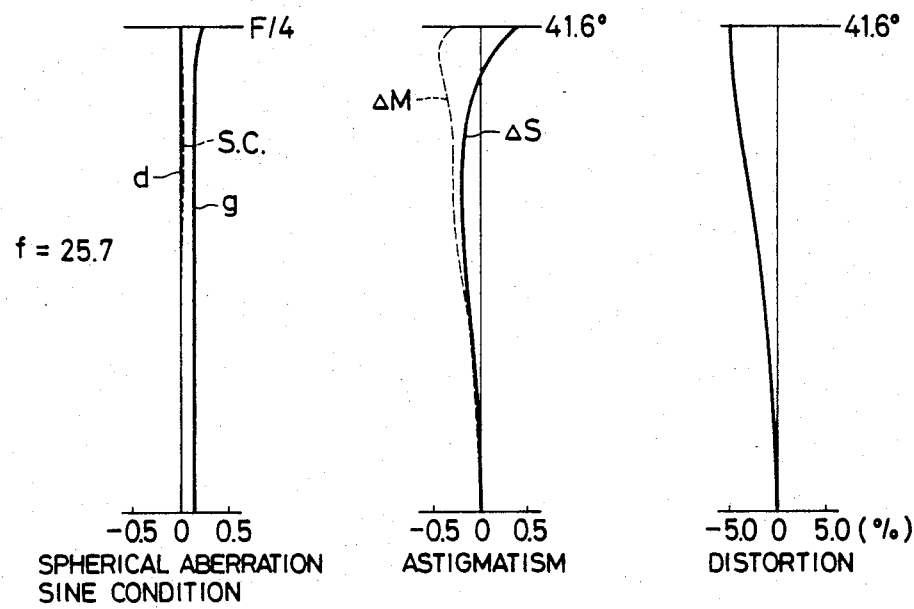
FIGS. 3 through 6 shows aberration diagrams in the first to fourth embodiments, respectively, in which (A), (B) and (C) indicate in the cases of short, intermediate and long focal lengths, respectively.
Figure 3B:
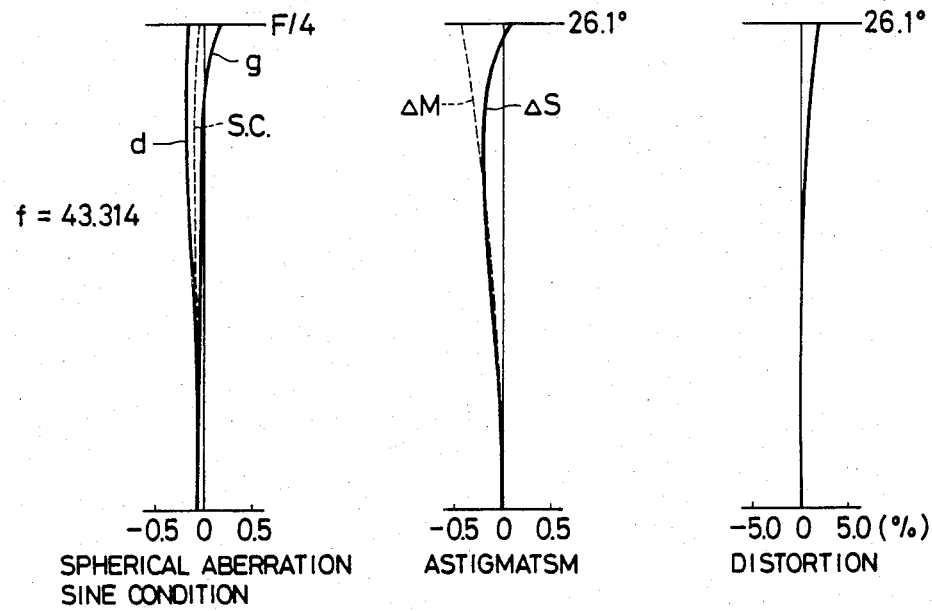
Figure 3C:
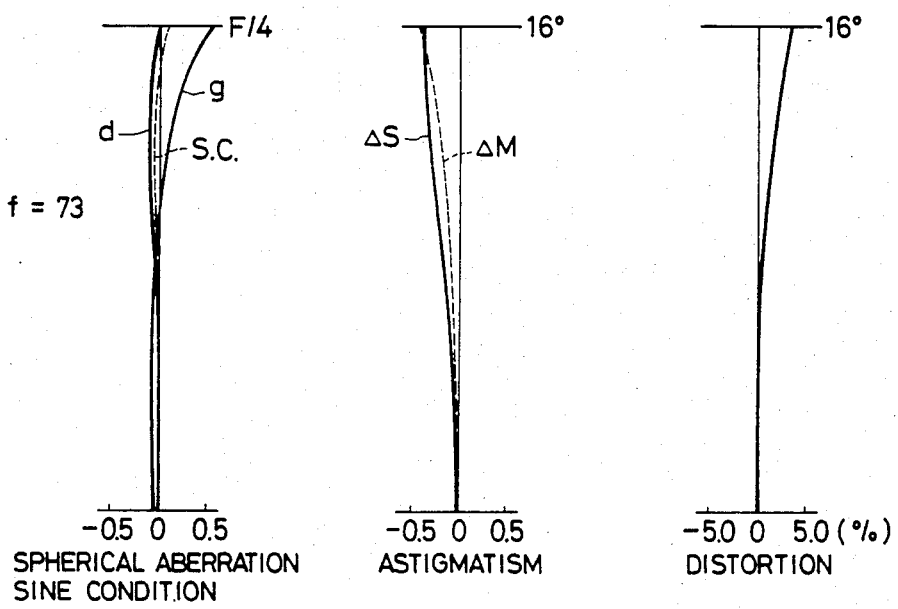

| First Embodiment | | | |
|---|---|---|---|
| $25.7 < f < 73$ | $F_{NO} = 4$ | | |
| $83.2° > 2\omega > 32°$ | Aberration Diagram in FIG. 3 | | |
| $r_1 = 94.156$ | | | |
| | $d_1 = 1.6$ | $n_1 = 1.67003$ | $v_1 = 47.2$ |
| $r_2 = 33.236$ | | | |
| | $d_2 = 7.8$ | | |
| $r_3 = 220.768$ | | | |
| | $d_3 = 4.4$ | $n_2 = 1.75500$ | $v_2 = 52.33$ |
| $r_4 = -128.656$ | | | |
| | $d_4 = .1$ | | |
| $r_5 = 99.691$ | | | |
| | $d_5 = 1.4$ | $n_3 = 1.69680$ | $v_3 = 55.46$ |
| $r_6 = 45.897$ | | | |
| | $d_6 = 4.7$ | | |
| $r_7 = -110.865$ | | | |
| | $d_7 = 1.3$ | $n_4 = 1.75500$ | $v_4 = 52.33$ |
| $r_8 = 25.117$ | | | |
| | $d_8 = 5.5$ | $n_5 = 1.84666$ | $v_5 = 23.83$ |
| $r_9 = 78.553$ | | | |
| | $d_9 = $ variable | | |
| $r_{10} = 99.482$ | | | |
| | $d_{10} = 2.3$ | $n_6 = 1.71300$ | $v_6 = 53.94$ |
| $r_{11} = -161.832$ | | | |
| | $d_{11} = .1$ | | |
| $r_{12} = 76.169$ | | | |
| | $d_{12} = .9$ | $n_7 = 1.84666$ | $v_7 = 23.83$ |
| $r_{13} = 20.565$ | | | |
| | $d_{13} = 5.0$ | $n_8 = 1.75500$ | $v_8 = 52.33$ |
| $r_{14} = 445.917$ | | | |
| | $d_{14} = .1$ | | |
| $r_{15} = 29.76$ | | | |
| | $d_{15} = 3.7$ | $n_9 = 1.62041$ | $v_9 = 60.34$ |
| $r_{16} = -364.194$ | | | |
| | $d_{16} = $ variable | | |
| $r_{17} = -83.25$ | | | |
| | $d_{17} = 1.8$ | $n_{10} = 1.84666$ | $v_{10} = 23.83$ |
| $r_{18} = -25.292$ | | | |
| | $d_{18} = .9$ | $n_{11} = 1.71300$ | $v_{11} = 53.94$ |
| $r_{19} = 57.893$ | | | |
| | $d_{19} = 2.3$ | | |
| $r_{20} = -32.375$ | | | |
| | $d_{20} = .9$ | $n_{12} = 1.69680$ | $v_{12} = 55.46$ |
| $r_{21} = 435.585$ | | | |
| | $d_{21} = $ variable | | |
| $r_{22} = -235.012$ | | | |
| | $d_{22} = 3.1$ | $n_{13} = 1.69680$ | $v_{13} = 55.46$ |
| $r_{23} = -24.932$ | | | |

| -continued | | | |
|---|---|---|---|
| First Embodiment | | | |
| | $d_{23} = .1$ | | |
| $r_{24} = 121.076$ | | | |
| | $d_{24} = 7.5$ | $n_{14} = 1.58913$ | $v_{14} = 61.25$ |
| $r_{25} = -15.903$ | | | |
| | $d_{25} = 1.0$ | $n_{15} = 1.83400$ | $v_{15} = 37.34$ |
| $r_{26} = -58.017$ | | | |

| | Variable Space Distance | | |
|---|---|---|---|
| f | 25.7 | 43.314 | 73 |
| $d_9$ | 31.908 | 12.109 | 1.221 |
| $d_{16}$ | 4.542 | 10.517 | 19.425 |
| $d_{21}$ | 8.969 | 5.856 | 1.528 |

The amounts of the conditional formula
(i) 1.362
(ii) 1.043
(iii) 0.943
(iv) 1.156
(v) 0.531
(vi) $0 < 0.35 < 0.675 < 1$ In order to carry out macro-photography with the use of this zoom lens, the second, third and fourth lens groups are moved from the shortest focal length by the following distances:
 the seconds lens group: 4.004
 the third lens group: 1.43
 the fourth lens group: 3.028

Figure 7A:
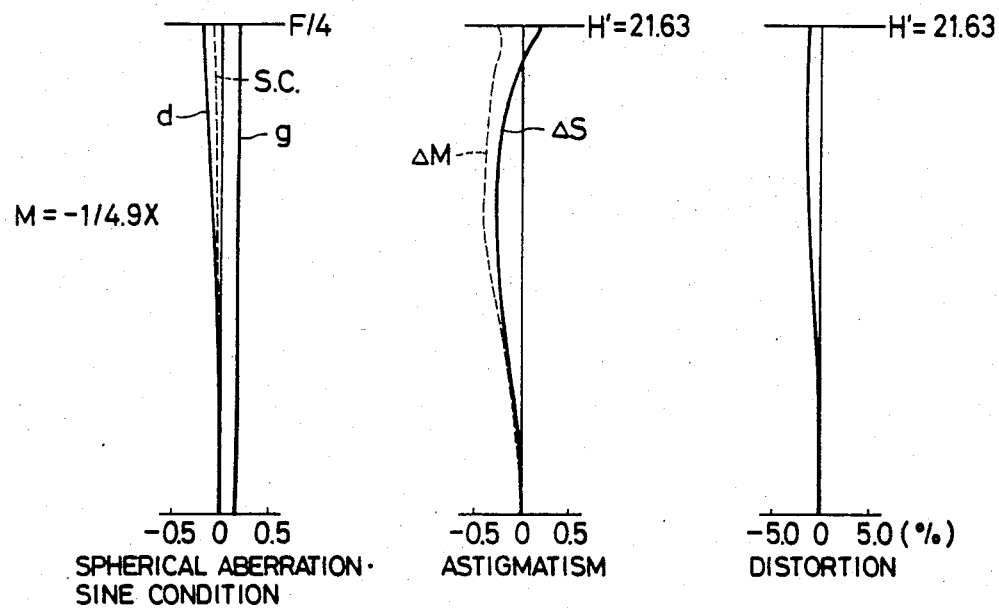
FIG. 7 shows an aberration diagram in the first embodiment upon macro-photography.
Figure 7B:
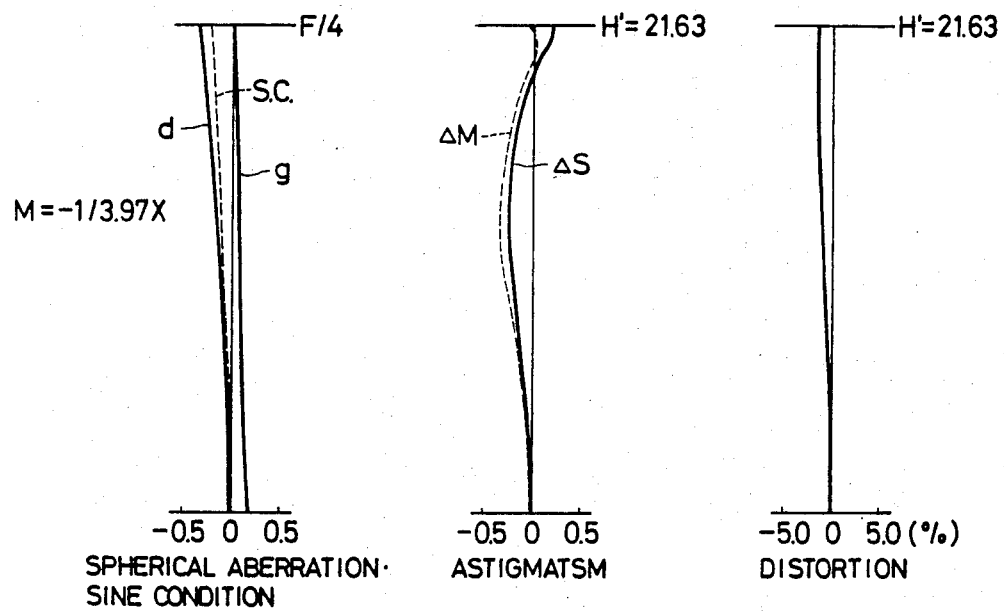

Thereby, an object positioned at 262 mm from the film surface can be photographed on a reduction rate of $-1/4.9\times$. The aberration diagram at this stage is shown in FIG. 7(A).

Further, the condition (6) is well-satisfied since:

$$0 < l_3/l_2(=0.35) < l_4/l_2(=0.741) < 1.$$

When the distance of close range photography is set to 0.8 mm in normal photography, it is necessary to feed out the first lens group by an amount of 1.747 mm to focus therefor. If this feed amount is superposed to the lens movement for macro-photography, an object positioned at 232 mm in the close range can be photographed on a reduction rate of $-1/3.97\times$. The aberration diagram at this stage is shown in FIG. 7(A).

Figure 4A:
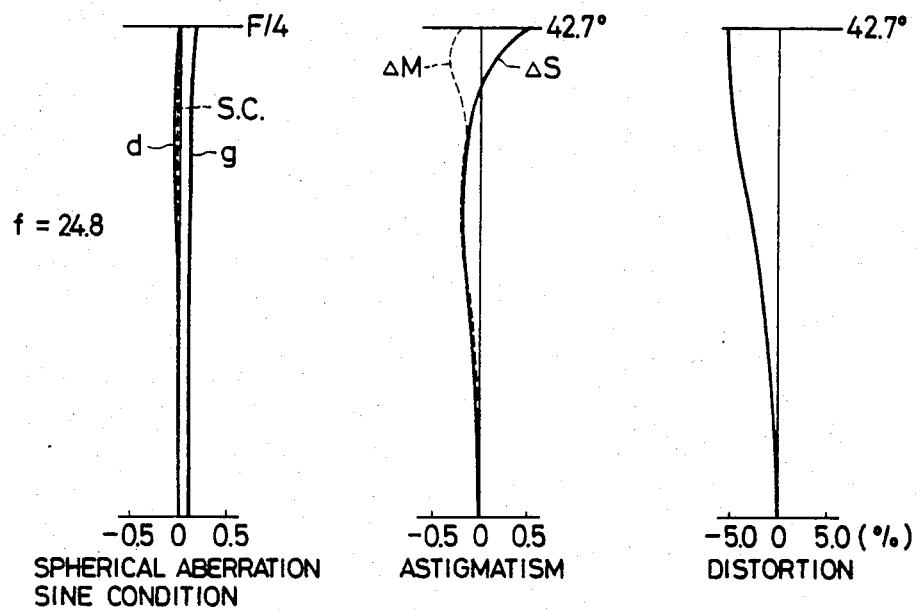
Figure 4B:
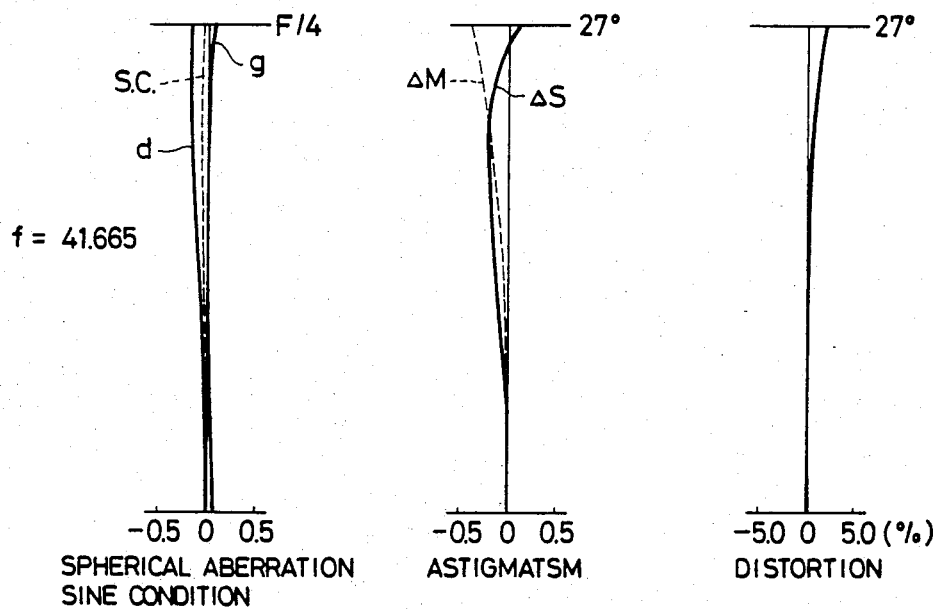

| Second Embodiment | | | |
|---|---|---|---|
| $24.8 \leq f \leq 70$ | $F_{NO} = 4$ | | |
| $85.4° > 2\omega > 33.2°$ | Aberration Diagram in FIG. 4 | | |
| $r_1 = 90.049$ | | | |
| | $d_1 = 1.6$ | $n_1 = 1.66672$ | $v_1 = 48.30$ |
| $r_2 = 33.900$ | | | |
| | $d_2 = 7.6$ | | |
| $r_3 = 218.528$ | | | |
| | $d_3 = 4.5$ | $n_2 = 1.71300$ | $v_2 = 53.94$ |
| $r_4 = -144.319$ | | | |
| | $d_4 = .1$ | | |
| $r_5 = 102.913$ | | | |
| | $d_5 = 1.4$ | $n_3 = 1.64000$ | $v_3 = 60.15$ |
| $r_6 = 41.332$ | | | |
| | $d_6 = 5.0$ | | |
| $r_7 = -149.196$ | | | |
| | $d_7 = 1.3$ | $n_4 = 1.75500$ | $v_4 = 52.33$ |
| $r_8 = 25.242$ | | | |
| | $d_8 = 5.5$ | $n_5 = 1.84666$ | $v_5 = 23.83$ |
| $r_9 = 73.930$ | | | |
| | $d_9 = $ variable | | |
| $r_{10} = 99.221$ | | | |
| | $d_{10} = 2.3$ | $n_6 = 1.71300$ | $v_6 = 53.94$ |
| $r_{11} = -176.043$ | | | |
| | $d_{11} = .1$ | | |
| $r_{12} = 98.353$ | | | |

-continued

Second Embodiment

| | | | |
|---|---|---|---|
| $r_{13} = 22.340$ | $d_{12} = .9$ | $n_7 = 1.84666$ | $\nu_7 = 23.83$ |
| $r_{14} = -2907.673$ | $d_{13} = 5.0$ | $n_8 = 1.75500$ | $\nu_8 = 52.33$ |
| $r_{15} = 29.376$ | $d_{14} = .1$ | | |
| $r_{16} = -380.375$ | $d_{15} = 3.7$ | $n_9 = 1.62041$ | $\nu_9 = 60.34$ |
| $r_{17} = -76.959$ | $d_{16} = $ variable | | |
| $r_{18} = -26.088$ | $d_{17} = 1.9$ | $n_{10} = 1.84666$ | $\nu_{10} = 23.83$ |
| $r_{19} = 86.694$ | $d_{18} = .9$ | $n_{11} = 1.71300$ | $\nu_{11} = 53.94$ |
| $r_{20} = -34.298$ | $d_{19} = 2.3$ | | |
| $r_{21} = 144.605$ | $d_{20} = .9$ | $n_{12} = 1.69680$ | $\nu_{12} = 55.46$ |
| $r_{22} = -228.816$ | $d_{21} = $ variable | | |
| $r_{23} = -24.460$ | $d_{22} = 3.0$ | $n_{13} = 1.69680$ | $\nu_{13} = 55.46$ |
| $r_{24} = 126.483$ | $d_{23} = .1$ | | |
| $r_{25} = -15.949$ | $d_{24} = 7.2$ | $n_{14} = 1.58913$ | $\nu_{14} = 61.25$ |
| $r_{26} = -57.092$ | $d_{25} = 1.1$ | $n_{15} = 1.83400$ | $\nu_{15} = 37.34$ |

| Variable Space Distance | | | |
|---|---|---|---|
| f | 24.8 | 41.665 | 70 |
| $d_9$ | 30.884 | 11.715 | 1.208 |
| $d_{16}$ | 4.002 | 10.287 | 19.613 |
| $d_{21}$ | 9.33 | 6.092 | 1.525 |

The amounts of the conditional formula
(i) 1.389
(ii) 1.089
(iii) 0.994
(iv) 1.003
(v) 0.521
(vi) $0 < 0.3 < 0.65 < 1$

Figure 5A:
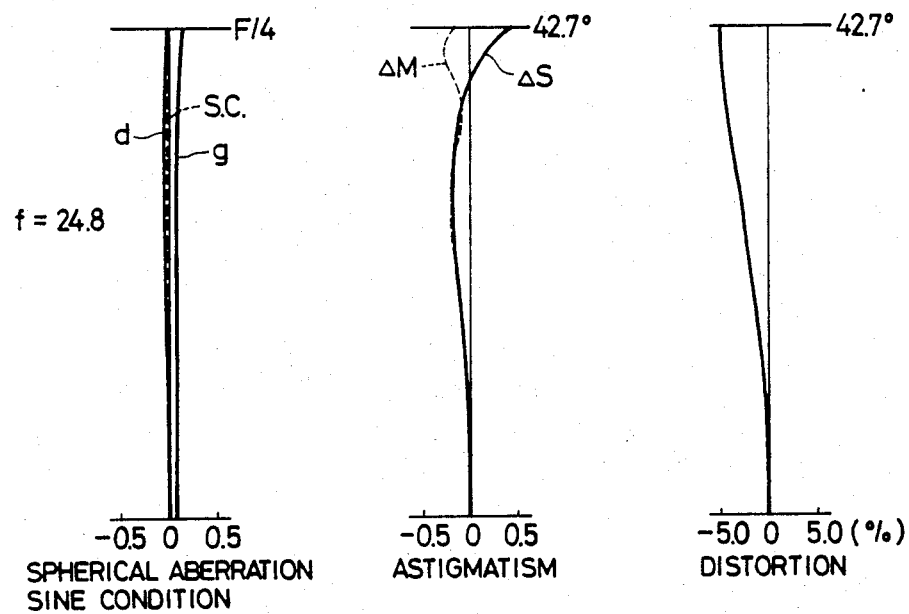
Figure 5B:
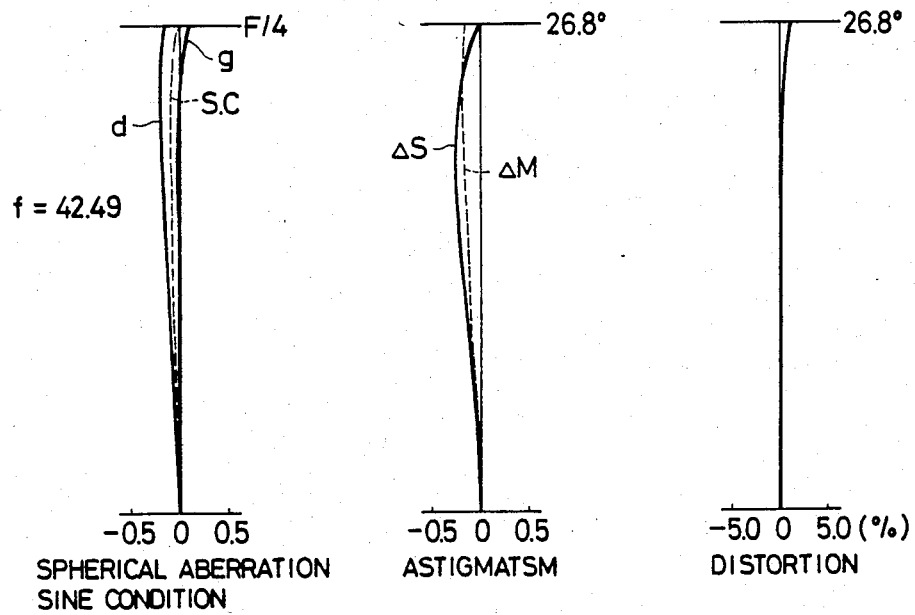

Third Embodiment $24.8 \leq f \leq 72.8$  $F_{NO} = 4$
$85.4° \geq 2\omega \geq 32.2°$ Aberration Diagram in FIG. 5

| | | | |
|---|---|---|---|
| $r_1 = 95.222$ | $d_1 = 1.6$ | $n_1 = 1.66672$ | $\nu_1 = 48.30$ |
| $r_2 = 35.025$ | $d_2 = 7.6$ | | |
| $r_3 = 188.753$ | $d_3 = 4.5$ | $n_2 = 1.69680$ | $\nu_2 = 55.46$ |
| $r_4 = -147.207$ | $d_4 = .1$ | | |
| $r_5 = 105.648$ | $d_5 = 1.4$ | $n_3 = 1.62041$ | $\nu_3 = 60.34$ |
| $r_6 = 40.548$ | $d_6 = 5.1$ | | |
| $r_7 = -191.182$ | $d_7 = 1.3$ | $n_4 = 1.75500$ | $\nu_4 = 52.33$ |
| $r_8 = 24.566$ | $d_8 = 5.5$ | $n_5 = 1.84666$ | $\nu_5 = 23.83$ |
| $r_9 = 66.528$ | $d_9 = $ variable | | |
| $r_{10} = 86.785$ | $d_{10} = 2.3$ | $n_6 = 1.71300$ | $\nu_6 = 53.94$ |
| $r_{11} = -311.359$ | $d_{11} = .1$ | | |
| $r_{12} = 78.584$ | $d_{12} = .9$ | $n_7 = 1.84666$ | $\nu_7 = 23.83$ |
| $r_{13} = 21.564$ | $d_{13} = 5.0$ | $n_8 = 1.75500$ | $\nu_8 = 52.33$ |
| $r_{14} = 541.895$ | $d_{14} = .1$ | | |
| $r_{15} = 29.638$ | | | |

-continued

Third Embodiment

| | | | |
|---|---|---|---|
| $r_{16} = -436.795$ | $d_{15} = 3.7$ | $n_9 = 1.62041$ | $\nu_9 = 60.34$ |
| $r_{17} = -103.359$ | $d_{16} = $ variable | | |
| $r_{18} = -28.864$ | $d_{17} = 1.9$ | $n_{10} = 1.84666$ | $\nu_{10} = 23.83$ |
| $r_{19} = 62.037$ | $d_{18} = .9$ | $n_{11} = 1.71300$ | $\nu_{11} = 53.94$ |
| $r_{20} = -31.025$ | $d_{19} = 2.3$ | | |
| $r_{21} = 1800.352$ | $d_{20} = .9$ | $n_{12} = 1.71300$ | $\nu_{12} = 53.94$ |
| $r_{22} = -157.739$ | $d_{21} = $ variable | | |
| $r_{23} = -24.981$ | $d_{22} = 3.0$ | $n_{13} = 1.71300$ | $\nu_{13} = 53.94$ |
| $r_{24} = 104.923$ | $d_{23} = .1$ | | |
| $r_{25} = -16.230$ | $d_{24} = 7.2$ | $n_{14} = 1.58913$ | $\nu_{14} = 61.25$ |
| $r_{26} = -57.580$ | $d_{25} = 1.1$ | $n_{15} = 1.83400$ | $\nu_{15} = 37.34$ |

| Variable Space Distance | | | |
|---|---|---|---|
| f | 24.8 | 42.49 | 72.8 |
| $d_9$ | 31.949 | 12.018 | 1.433 |
| $d_{16}$ | 3.708 | 9.876 | 19.311 |
| $d_{21}$ | 9.259 | 5.946 | 1.457 |

The amounts of the conditional formula
(i) 1.401
(ii) 1.111
(iii) 1.109
(iv) 1.222
(v) 0.516
(vi) $0 < 0.4 < 0.7 < 1.0$

Figure 6C:
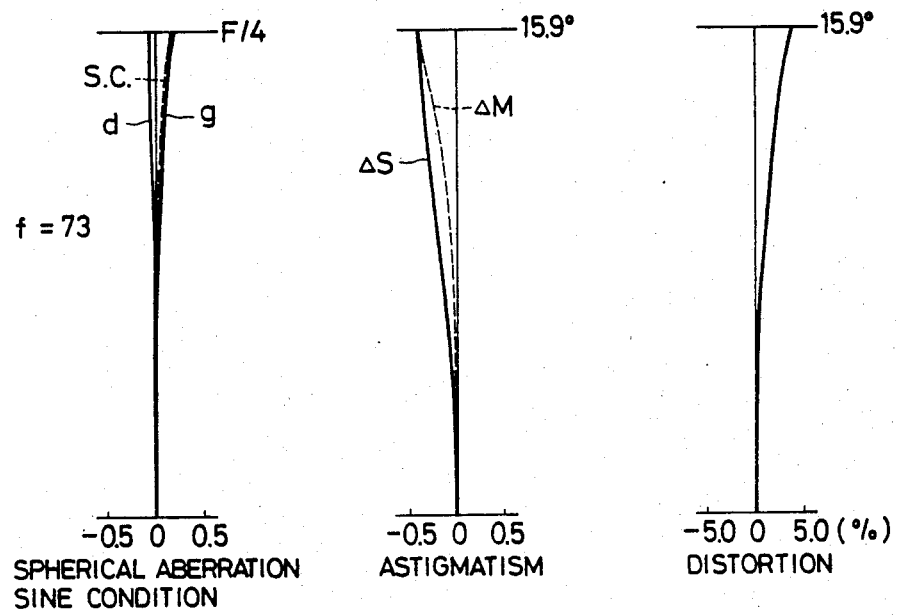

Fourth Embodiment $25.7 \leq f \leq 73$  $F_{NO} = 4$
$83.4° > 2\omega > 31.8°$ Aberration Diagram in FIG. 6

| | | | |
|---|---|---|---|
| $r_1 = 84.928$ | $d_1 = 1.6$ | $n_1 = 1.67003$ | $\nu_1 = 47.20$ |
| $r_2 = 31.837$ | $d_2 = 8.1$ | | |
| $r_3 = 256.904$ | $d_3 = 4.2$ | $n_2 = 1.71300$ | $\nu_2 = 53.94$ |
| $r_4 = -127.262$ | $d_4 = .1$ | | |
| $r_5 = 113.601$ | $d_5 = 1.4$ | $n_3 = 1.62041$ | $\nu_3 = 60.34$ |
| $r_6 = 49.737$ | $d_6 = 4.6$ | | |
| $r_7 = -131.053$ | $d_7 = 1.3$ | $n_4 = 1.71300$ | $\nu_4 = 53.94$ |
| $r_8 = 22.236$ | $d_8 = 6.0$ | $n_5 = 1.80518$ | $\nu_5 = 25.46$ |
| $r_9 = 63.486$ | $d_9 = $ variable | | |
| $r_{10} = 96.464$ | $d_{10} = 0\,2.3$ | $n_6 = 1.71300$ | $\nu_6 = 53.94$ |
| $r_{11} = -167.838$ | $d_{11} = .1$ | | |
| $r_{12} = 63.858$ | $d_{12} = .9$ | $n_7 = 1.84666$ | $\nu_7 = 23.83$ |
| $r_{13} = 20.058$ | $d_{13} = 5.2$ | $n_8 = 1.75500$ | $\nu_8 = 52.33$ |
| $r_{14} = 196.304$ | $d_{14} = .1$ | | |
| $r_{15} = 30.338$ | $d_{15} = 3.9$ | $n_9 = 1.62041$ | $\nu_9 = 60.34$ |
| $r_{16} = -274.039$ | $d_{16} = $ variable | | |
| $r_{17} = -71.458$ | $d_{17} = 2.1$ | $n_{10} = 1.80518$ | $\nu_{10} = 25.46$ |
| $r_{18} = -22.061$ | | | |

-continued

Fourth Embodiment

| | | | | |
|---|---|---|---|---|
| $r_{19} = 65.142$ | $d_{18} = .9$ | | $n_{11} = 1.71300$ | $\nu_{11} = 53.94$ |
| | $d_{19} = 2.3$ | | | |
| $r_{20} = -35.803$ | | | | |
| | $d_{20} = .9$ | | $n_{12} = 1.69680$ | $\nu_{12} = 55.46$ |
| $r_{21} = 259.242$ | | | | |
| | $d_{21} = $ variable | | | |
| $r_{22} = -294.242$ | | | | |
| | $d_{22} = 3.1$ | | $n_{13} = 1.69680$ | $\nu_{13} = 55.46$ |
| $r_{23} = -25.251$ | | | | |
| | $d_{23} = .1$ | | | |
| $r_{24} = 165.577$ | | | | |
| | $d_{24} = 7.0$ | | $n_{14} = 1.58913$ | $\nu_{14} = 61.25$ |
| $r_{25} = -15.718$ | | | | |
| | $d_{25} = 1.0$ | | $n_{15} = 1.83400$ | $\nu_{15} = 37.34$ |
| $r_{26} = -52.669$ | | | | |

Variable Space Distance

| f | 25.7 | 43.314 | 73 |
|---|---|---|---|
| $d_9$ | 31.928 | 12.154 | 1.242 |
| $d_{16}$ | 4.16 | 10.107 | 19.043 |
| $d_{21}$ | 8.635 | 5.47 | 1.194 |

The amounts of the conditional formula
(i) 1.362
(ii) 1.042
(iii) 0.934
(iv) 1.039
(v) 0.537
(vi) $0 < 0.35 < 0.675 < 1.0$

What is claimed is:

1. A zoom lens including a first lens group having a negative refractive power, a second lens group having a positive refractive power, a third lens group having a negative refractive power and a fourth lens group having a positive refractive power, which are arranged in the mentioned order from the objective side of the zoom lens, said third lens group having therein an air lens, and said fourth lens group having therein at least one joint surface, wherein upon zooming from the short focal length side to the long focal length side, said first-lens group moves at first to the image side and then is reversed to move toward the objective side, while said second, third and fourth lens group monotonously move toward the objective side by different distances, respectively, and further the following conditions are satisfied:

$$1.2 < |f_1|/f_w < 1.8$$

$$0.9 < f_2/f_w < 1.4$$

$$0.8 < |f_3|/f_w < 1.3$$

$$0.9 < \{(r_{20} - r_{21})/r_{20} \cdot r_{21}\} \cdot f_3 < 1.5$$

$$0.4 < \{(n_{14} - n_{15})/r_{26}\} \cdot f_4 < 0.7$$

$$0 < l_3/l_2 < l_4/l_2 < 1$$

where
 $f_2$: shortest focal length;
 $f_i$: focal length of i-th lens group;
 $l_i$: moving distance of i-th lens group upon zooming;
 $r_{20}, r_{21}$: radii of curvature of objective and image side surfaces of air lens in third lens group:
 $r_{26}$: radius of curvature of joint surface in fourth lens group; and $n_{14}, n_{15}$: refractive indexes of lens materials on both sides of joint surface in fourth lens group, with respect to d-ray.

2. A zoom lens as set forth in claim 1, wherein said first lens group comprises a negative meniscus single lens having its convex surface directed to the objective side, a positive single lens, a negative meniscus single lens having its convex surface directed to the objective side and a jointed lens including a double-concave lens and a positive meniscus lens having its convex surface directed to the objective side which are jointed together, said those lenses being arranged in the mentioned order from the objective side.

3. A zoom lens as set forth in claim 1 or 2, wherein said second lens group comprises a positive single lens, a jointed lens including a negative meniscus lens having its convex surface directed to the objective side and a positive lens which are jointed together, and a positive single lens, said those lens being arranged in the mentioned order from the objective side, and said third lens group comprises a jointed lens including a positive meniscus lens having its convex surface directed to the image side and a double-concave single lens which are jointed together, and a negative single lens.

4. A zoom lens as set forth in claim 1, or 2, wherein said second, and third and fourth lens groups can be moved toward the objective side in accordance with the following conditions:

$$0 < l_3/l_2 < l_4/l_2 < 1$$

thereby, macro-photography can be made.

5. A zoom lens as set forth in claim 1 as shown by the following data:

| | $25.7 < f < 73$ $83.2° > 2\omega > 32°$ | $F_{NO} = 4$ | | |
|---|---|---|---|---|
| $r_1 = 94.156$ | | | | |
| | $d_1 = 1.6$ | | $n_1 = 1.67003$ | $\nu_1 = 47.2$ |
| $r_2 = 33.236$ | | | | |
| | $d_2 = 7.8$ | | | |
| $r_3 = 220.768$ | | | | |
| | $d_3 = 4.4$ | | $n_2 = 1.75500$ | $\nu_2 = 52.33$ |
| $r_4 = -128.656$ | | | | |
| | $d_4 = .1$ | | | |
| $r_5 = 99.691$ | | | | |
| | $d_5 = 1.4$ | | $n_3 = 1.69680$ | $\nu_3 = 55.46$ |
| $r_6 = 45.897$ | | | | |
| | $d_6 = 4.7$ | | | |
| $r_7 = -110.865$ | | | | |
| | $d_7 = 1.3$ | | $n_4 = 1.75500$ | $\nu_4 = 52.33$ |
| $r_8 = 25.117$ | | | | |
| | $d_8 = 5.5$ | | $n_5 = 1.84666$ | $\nu_5 = 23.83$ |
| $r_9 = 78.553$ | | | | |
| | $d_9 = $ variable | | | |
| $r_{10} = 99.482$ | | | | |
| | $d_{10} = 2.3$ | | $n_6 = 1.71300$ | $\nu_6 = 53.94$ |
| $r_{11} = -161.832$ | | | | |
| | $d_{11} = .1$ | | | |
| $r_{12} = 76.169$ | | | | |
| | $d_{12} = .9$ | | $n_7 = 1.84666$ | $\nu_7 = 23.83$ |
| $r_{13} = 20.565$ | | | | |
| | $d_{13} = 5.0$ | | $n_8 = 1.75500$ | $\nu_8 = 52.33$ |
| $r_{14} = 445.917$ | | | | |
| | $d_{14} = .1$ | | | |
| $r_{15} = 29.76$ | | | | |
| | $d_{15} = 3.7$ | | $n_9 = 1.62041$ | $\nu_9 = 60.34$ |
| $r_{16} = -364.194$ | | | | |
| | $d_{16} = $ variable | | | |
| $r_{17} = -83.25$ | | | | |
| | $d_{17} = 1.8$ | | $n_{10} = 1.84666$ | $\nu_{10} = 23.83$ |
| $r_{18} = -25.292$ | | | | |
| | $d_{18} = .9$ | | $n_{11} = 1.71300$ | $\nu_{11} = 53.94$ |
| $r_{19} = 57.893$ | | | | |
| | $d_{19} = 2.3$ | | | |

-continued

| | | | |
|---|---|---|---|
| $r_{20} = -32.375$ | | | |
| | $d_{20} = .9$ | $n_{12} = 1.69680$ | $\nu_{12} = 55.46$ |
| $r_{21} = 435.585$ | | | |
| | $d_{21}$ = variable | | |
| $r_{22} = -235.012$ | | | |
| | $d_{22} = 3.1$ | $n_{13} = 1.69680$ | $\nu_{13} = 55.46$ |
| $r_{23} = -24.932$ | | | |
| | $d_{23} = .1$ | | |
| $r_{24} = 121.076$ | | | |
| | $d_{24} = 7.5$ | $n_{14} = 1.58913$ | $\nu_{14} = 61.25$ |
| $r_{25} = -15.903$ | | | |
| | $d_{25} = 1.0$ | $n_{15} = 1.83400$ | $\nu_{15} = 37.34$ |
| $r_{26} = -58.017$ | | | |

| Variable space distance: | | | |
|---|---|---|---|
| f | 25.7 | 43.314 | 73 |
| $d_9$ | 31.908 | 12.109 | 1.221 |
| $d_{16}$ | 4.542 | 10.517 | 19.425 |
| $d_{21}$ | 8.969 | 5.856 | 1.528 | where
f: synthetic focal length of total system
w: half image angle
r: radius of curvature of refractive surface
d: space distance between refractive surfaces
n: refractive index
$\nu$: abbe's number.

6. A zoom lens as set forth in claim 5, wherein said second, third and fourth lens groups are moved respectively by
said second lens: 4.084
said third lens: 1.43
said fourth lens: 3.028
thereby macro-photography is made.

7. A zoom lens as set forth in claim 1 as shown by the following data:

| | | | |
|---|---|---|---|
| | $24.8 \leqq f \leqq 70$ | $F_{NO} = 4$ | |
| | $85.4° > 2\omega > 33.2°$ | | |
| $r_1 = 90.049$ | | | |
| | $d_1 = 1.6$ | $n_1 = 1.66672$ | $\nu_1 = 48.30$ |
| $r_2 = 33.900$ | | | |
| | $d_2 = 7.6$ | | |
| $r_3 = 218.528$ | | | |
| | $d_3 = 4.5$ | $n_2 = 1.71300$ | $\nu_2 = 53.94$ |
| $r_4 = -144.319$ | | | |
| | $d_4 = .1$ | | |
| $r_5 = 102.913$ | | | |
| | $d_5 = 1.4$ | $n_3 = 1.64000$ | $\nu_3 = 60.15$ |
| $r_6 = 41.332$ | | | |
| | $d_6 = 5.0$ | | |
| $r_7 = -149.196$ | | | |
| | $d_7 = 1.3$ | $n_4 = 1.75500$ | $\nu_4 = 52.33$ |
| $r_8 = 25.242$ | | | |
| | $d_8 = 5.5$ | $n_5 = 1.84666$ | $\nu_5 = 23.83$ |
| $r_9 = 73.930$ | | | |
| | $d_9$ = variable | | |
| $r_{10} = 99.221$ | | | |
| | $d_{10} = 2.3$ | $n_6 = 1.71300$ | $\nu_6 = 53.94$ |
| $r_{11} = -176.043$ | | | |
| | $d_{11} = .1$ | | |
| $r_{12} = 98.353$ | | | |
| | $d_{12} = .9$ | $n_7 = 1.84666$ | $\nu_7 = 23.83$ |
| $r_{13} = 22.340$ | | | |
| | $d_{13} = 5.0$ | $n_8 = 1.75500$ | $\nu_8 = 52.33$ |
| $r_{14} = -2907.673$ | | | |
| | $d_{14} = .1$ | | |
| $r_{15} = 29.376$ | | | |
| | $d_{15} = 3.7$ | $n_9 = 1.62041$ | $\nu_9 = 60.34$ |
| $r_{16} = -380.375$ | | | |
| | $d_{16}$ = variable | | |
| $r_{17} = -76.959$ | | | |
| | $d_{17} = 1.9$ | $n_{10} = 1.84666$ | $\nu_{10} = 23.83$ |
| $r_{18} = -26.088$ | | | |
| | $d_{18} = .9$ | $n_{11} = 1.71300$ | $\nu_{11} = 53.94$ |
| $r_{19} = 86.694$ | | | |

-continued

| | | | |
|---|---|---|---|
| | $d_{19} = 2.3$ | | |
| $r_{20} = -34.298$ | | | |
| | $d_{20} = .9$ | $n_{12} = 1.69680$ | $\nu_{12} = 55.46$ |
| $r_{21} = 144.605$ | | | |
| | $d_{21}$ = variable | | |
| $r_{22} = -228.816$ | | | |
| | $d_{22} = 3.0$ | $n_{13} = 1.69680$ | $\nu_{13} = 55.46$ |
| $r_{23} = -24.460$ | | | |
| | $d_{23} = .1$ | | |
| $r_{24} = 126.483$ | | | |
| | $d_{24} = 7.2$ | $n_{14} = 1.58913$ | $\nu_{14} = 61.25$ |
| $r_{25} = -15.949$ | | | |
| | $d_{25} = 1.1$ | $n_{15} = 1.83400$ | $\nu_{15} = 37.34$ |
| $r_{26} = -57.092$ | | | |

| Variable space distance | | | |
|---|---|---|---|
| f | 24.8 | 41.665 | 70 |
| $d_9$ | 30.884 | 11.715 | 1.208 |
| $d_{16}$ | 4.002 | 10.287 | 19.613 |
| $d_{21}$ | 9.33 | 6.092 | 1.525 |

8. A zoom lens as set forth in claim 1 as shown by the following data;

| | | | |
|---|---|---|---|
| | $24.8 \leqq f \leqq 72.8$ | $F_{NO} = 4$ | |
| | $85.4° \geqq 2\omega \geqq 32.2°$ | | |
| $r_1 = 95.222$ | | | |
| | $d_1 = 1.6$ | $n_1 = 1.66672$ | $\nu_1 = 48.30$ |
| $r_2 = 35.025$ | | | |
| | $d_2 = 7.6$ | | |
| $r_3 = 188.753$ | | | |
| | $d_3 = 4.5$ | $n_2 = 1.69680$ | $\nu_2 = 55.46$ |
| $r_4 = -147.207$ | | | |
| | $d_4 = .1$ | | |
| $r_5 = 105.648$ | | | |
| | $d_5 = 1.4$ | $n_3 = 1.62041$ | $\nu_3 = 60.34$ |
| $r_6 = 40.548$ | | | |
| | $d_6 = 5.1$ | | |
| $r_7 = -191.182$ | | | |
| | $d_7 = 1.3$ | $n_4 = 1.75500$ | $\nu_4 = 52.33$ |
| $r_8 = 24.566$ | | | |
| | $d_8 = 5.5$ | $n_5 = 1.84666$ | $\nu_5 = 23.83$ |
| $r_9 = 66.528$ | | | |
| | $d_9$ = variable | | |
| $r_{10} = 86.785$ | | | |
| | $d_{10} = 2.3$ | $n_6 = 1.71300$ | $\nu_6 = 53.94$ |
| $r_{11} = -311.359$ | | | |
| | $d_{11} = .1$ | | |
| $r_{12} = 78.584$ | | | |
| | $d_{12} = .9$ | $n_7 = 1.84666$ | $\nu_7 = 23.83$ |
| $r_{13} = 21.564$ | | | |
| | $d_{13} = 5.0$ | $n_8 = 1.75500$ | $\nu_8 = 52.33$ |
| $r_{14} = 541.895$ | | | |
| | $d_{14} = .1$ | | |
| $r_{15} = 29.638$ | | | |
| | $d_{15} = 3.7$ | $n_9 = 1.62041$ | $\nu_9 = 60.34$ |
| $r_{16} = -436.795$ | | | |
| | $d_{16}$ = variable | | |
| $r_{17} = -103.359$ | | | |
| | $d_{17} = 1.9$ | $n_{10} = 1.84666$ | $\nu_{10} = 23.83$ |
| $r_{18} = -288.864$ | | | |
| | $d_{18} = .9$ | $n_{11} = 1.71300$ | $\nu_{11} = 53.94$ |
| $r_{19} = 62.037$ | | | |
| | $d_{19} = 2.3$ | | |
| $r_{20} = -31.025$ | | | |
| | $d_{20} = .9$ | $n_{12} = 1.71300$ | $\nu_{12} = 53.94$ |
| $r_{21} = 1800.352$ | | | |
| | $d_{21}$ = variable | | |
| $r_{22} = -157.739$ | | | |
| | $d_{22} = 3.0$ | $n_{13} = 1.71300$ | $\nu_{13} = 53.94$ |
| $r_{23} = -24.981$ | | | |
| | $d_{23} = .1$ | | |
| $r_{24} = 104.923$ | | | |
| | $d_{24} = 7.2$ | $n_{14} = 1.58913$ | $\nu_{14} = 61.25$ |
| $r_{25} = -16.230$ | | | |
| | $d_{25} = 1.1$ | $n_{15} = 1.83400$ | $\nu_{15} = 37.34$ |
| $r_{26} = -57.580$ | | | |

Variable space distance

| f | 24.8 | 42.49 | 72.8 |
|---|---|---|---|
| $d_9$ | 31.949 | 12.018 | 1.433 |
| $d_{16}$ | 3.708 | 9.876 | 19.311 |
| $d_{21}$ | 9.259 | 5.946 | 1.457 |

9. A zoom lens as set forth in claim 1 as shown by the following data:

$25.7 \leq f \leq 73$  $F_{NO} = 4$
$83.4° > 2\omega > 31.8°$

| | | | |
|---|---|---|---|
| $r_1 = 84.928$ | | | |
| | $d_1 = 1.6$ | $n_1 = 1.67003$ | $\nu_1 = 47.20$ |
| $r_2 = 31.837$ | | | |
| | $d_2 = 8.1$ | | |
| $r_3 = 256.904$ | | | |
| | $d_3 = 4.2$ | $n_2 = 1.71300$ | $\nu_2 = 53.94$ |
| $r_4 = -127.262$ | | | |
| | $d_4 = .1$ | | |
| $r_5 = 113.601$ | | | |
| | $d_5 = 1.4$ | $n_3 = 1.62041$ | $\nu_3 = 60.34$ |
| $r_6 = 49.737$ | | | |
| | $d_6 = 4.6$ | | |
| $r_7 = -131.053$ | | | |
| | $d_7 = 1.3$ | $n_4 = 1.71300$ | $\nu_4 = 53.94$ |
| $r_8 = 22.236$ | | | |
| | $d_8 = 6.0$ | $n_5 = 1.80518$ | $\nu_5 = 25.46$ |
| $r_9 = 63.486$ | | | |
| | $d_9 = $ variable | | |
| $r_{10} = 96.464$ | | | |
| | $d_{10} = 2.3$ | $n_6 = 1.71300$ | $\nu_6 = 53.94$ |
| $r_{11} = -167.838$ | | | |
| | $d_{11} = .1$ | | |
| $r_{12} = 63.858$ | | | |
| | $d_{12} = .9$ | $n_7 = 1.84666$ | $\nu_7 = 23.83$ |
| $r_{13} = 20.058$ | | | |
| | $d_{13} = 5.2$ | $n_8 = 1.75500$ | $\nu_8 = 52.33$ |
| $r_{14} = 196.304$ | | | |
| $r_{15} = 30.338$ | | | |
| | $d_{14} = .1$ | | |
| | $d_{15} = 3.9$ | $n_9 = 1.62041$ | $\nu_9 = 60.34$ |
| $r_{16} = -274.039$ | | | |
| | $d_{16} = $ variable | | |
| $r_{17} = -71.458$ | | | |
| | $d_{17} = 2.1$ | $n_{10} = 1.80518$ | $\nu_{10} = 25.46$ |
| $r_{18} = -22.061$ | | | |
| | $d_{18} = .9$ | $n_{11} = 1.71300$ | $\nu_{11} = 53.94$ |
| $r_{19} = 65.142$ | | | |
| | $d_{19} = 2.3$ | | |
| $r_{20} = -35.803$ | | | |
| | $d_{20} = .9$ | $n_{12} = 1.69680$ | $\nu_{12} = 55.46$ |
| $r_{21} = 259.242$ | | | |
| | $d_{21} = $ variable | | |
| $r_{22} = -294.242$ | | | |
| | $d_{22} = 3.1$ | $n_{13} = 1.69680$ | $\nu_{13} = 55.46$ |
| $r_{23} = -25.251$ | | | |
| | $d_{23} = .1$ | | |
| $r_{24} = 165.577$ | | | |
| | $d_{24} = 7.0$ | $n_{14} = 1.58913$ | $\nu_{14} = 61.25$ |
| $r_{25} = -15.718$ | | | |
| | $d_{25} = 1.0$ | $n_{15} = 1.83400$ | $\nu_{15} = 37.34$ |
| $r_{26} = -52.669$ | | | |

| | Variable space distance | | |
|---|---|---|---|
| f | 25.7 | 43.314 | 73 |
| $d_9$ | 31.928 | 12.154 | 1.242 |
| $d_{16}$ | 4.16 | 10.107 | 19.043 |
| $d_{21}$ | 8.635 | 5.47 | 1.194 |

10. A zoom lens as set forth in claim 3, wherein said second, third and fourth lens groups can be moved toward the objective side in accordance with the following conditions:

$0 < l_3/l_2 < l_4/l_2 < 1$ thereby, macro-photography can be made.

* * * * *